Figure 1:
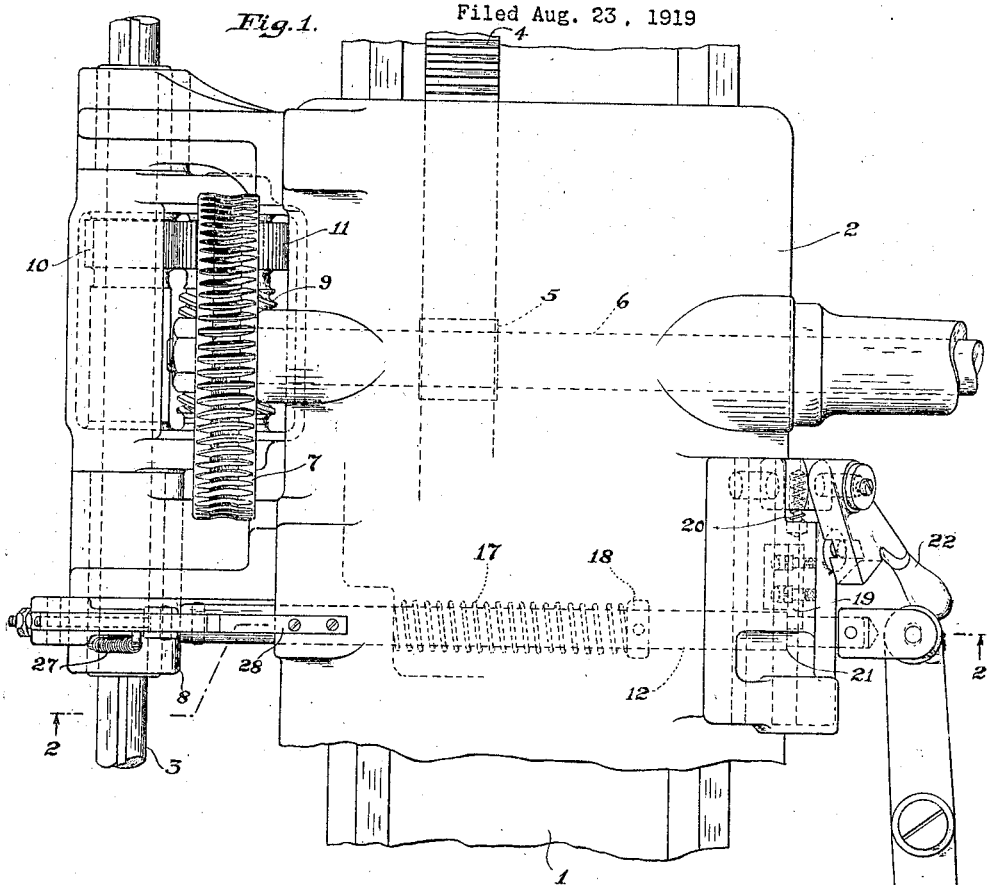

April 15, 1924.

J. C. BAKER

DROP WORM MECHANISM

Filed Aug. 23, 1919

1,490,411

Inventor
John C. Baker
By S. Jay Teller
Attorney.

Patented Apr. 15, 1924.

1,490,411

UNITED STATES PATENT OFFICE.

JOHN C. BAKER, OF WORCESTER, MASSACHUSETTS, ASSIGNOR TO PRATT & WHITNEY COMPANY, OF NEW YORK, N. Y., A CORPORATION OF NEW JERSEY.

DROP WORM MECHANISM.

Application filed August 23, 1919. Serial No. 319,438.

*To all whom it may concern:*

Be it known that I, JOHN C. BAKER, a citizen of the United States, residing at Worcester, in the county of Worcester and State of Massachusetts, have invented certain new and useful Improvements in Drop Worm Mechanism, of which the following is a specification.

This invention relates to a power transmission mechanism and particularly to that type of mechanism wherein two coacting rotatable toothed driving elements are resiliently forced into full driving engagement when the teeth thereon come into a meshing position. The invention broadly contemplates means to thereafter automatically and positively lock such elements in the driving engagement and means to automatically unlock the locking means when disengaging the driving elements.

In machines involving mechanism of this character in general use, the operator, when trying to engage the elements, often finds the top of the teeth of one engaging the top of the teeth of the other and has to hold the elements together and wait until the driver element rotates sufficiently to bring the cooperating teeth into the relative meshing position. The present invention provides a mechanism whereby the operator when engaging the elements, may so set them that the full driving engagement thereafter takes place automatically, thereby eliminating this loss of time to the operator.

It is a novel feature and particular object of this invention to provide a means, in addition to and in combination with this automatically engaging mechanism, for positively and automatically locking the elements in their driving position at the moment they reach the full driving engagement. Accidental disengagement of the elements during the operation of the machine might be of great damage and particularly so in precision machines where a definite relative position is initially established between such elements. The present construction positively prevents any disengagement between the elements during the driving operation.

It is a further and particular object of the invention to provide means for automatically unlocking the positive locking means when disengaging the said elements. To this end, I provide unlocking means which automatically acts to release the locking means upon the first movement of the disengaging means and to thereby permit full disengagement of the driving elements.

While in its broad aspect the invention may be applied to other forms of transmission mechanism, for purposes of illustration herein, I prefer to disclose the invention as applied to a worm and worm wheel drive. The worm is preferably mounted in a rocker in such manner that the operator may, by a simple movement, place and secure the elements in such an engaging position that they will automatically fully engage upon reaching the proper relative meshing position. A latch is provided to automatically snap into locking position when this full driving engagement takes place and to hold the elements positively so engaged. Also a latch lifting means is provided whereby the positive latch is automatically released and the worm allowed to drop upon movement of the disengaging mechanism by the operator. All the parts of the mechanism are so relatively combined that they operate automatically in sequence to either engage or disengage the driving elements upon a simple movement of a controlling element on the machine by the operator.

For purposes of illustration, the invention has been shown in the drawing as applied to the feed mechanism of a hand turret lathe, however it should be clearly understood that the invention is not limited thereto nor to use on any particular structure. Also, though the invention has been illustrated in connection with a worm driven mechanism, yet in its broad aspect the invention is in no way limited thereto. Reference to the claims should be had for determining the scope of the invention.

Figure 2:
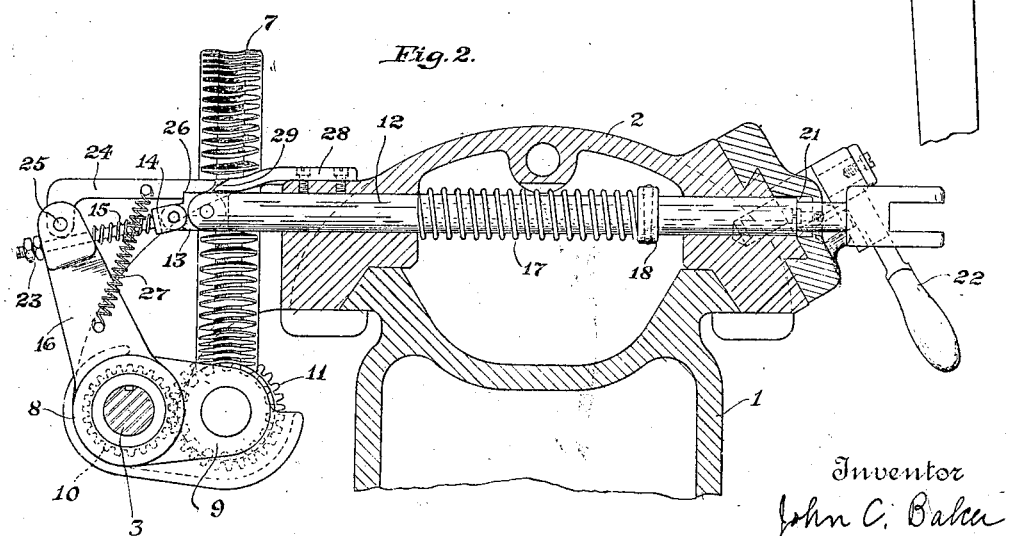

Referring to the drawing:

Fig. 1 is a broken-away plan view of a hand turret lathe feed mechanism, showing the present invention applied thereto, and Fig. 2 is a transverse sectional view thereof on line 2—2 of Fig. 1, looking in the direction of the arrow.

Referring more specifically to the invention by reference to the drawing, 1 designates a lathe bed and 2 the feed carriage thereon. The present invention is herein shown as applied to these members and to the splined feed shaft 3 running parallel with the bed 1.

The carriage 2 is movable longitudinally on the bed 1 by means of a rack 4, a pinion 5, a shaft 6 and a worm wheel 7, all such elements being operatively connected as shown in the drawing. As a means for connecting and disconnecting the drive shaft 3 with these elements, a rocker 8, carrying a worm 9 thereon to engage the worm wheel 7, is slidably mounted on the shaft 3. A gear 10 is slidably keyed to the shaft 3 and meshes with a gear 11 on the worm.

In mechanism of this type in general use, the operator may engage or disengage the driving worm with the worm wheel at will but, as has been previously stated, a considerable loss of time is occasioned by the engaging process when the worm must be held manually against the worm wheel until the teeth thereon come into a meshing position. The present invention aims broadly to provide means for automatically engaging and positively locking the elements in driving engagement when the teeth thereon come into a meshing position and to provide further means for automatically releasing the locking means when disengaging the elements. As one embodiment for accomplishing these objects, the structure herein illustrated has been devised and will now be described.

An operating rod 12 is connected to the rocker 8 through a block 13 hinged thereto and a bolt 14 hinged to the block 13 and surrounded by a compression spring 15 bearing against arm 16 of the rocker. A larger and stronger compression spring 17 surrounds the rod 12 and bears against a collar 18 thereon to normally move the rod to the right and disengage the driving worm. This movement of the rod may however be prevented by a latch 19 automatically operated by a spring 20 to normally engage the latch behind a shoulder 21 on the rod, which rod acting through the spring 15 resiliently holds the worm in engagement with its worm wheel. When it is desired to disengage these parts, the operator lifts the latch 19 by means of handle 22, and spring 17 thereupon operates to move the rod 12 to the right and drop the worm from its engagement.

The means provided for automatically engaging the worm into driving contact with its worm wheel comprises principally the spring 15 having bearing at its ends against the head of the bolt 14 and the rocker arm 16. The bolt 14 is slidably mounted in the arm 16, its movement in one direction being limited by check nuts 23 and in the other direction by the compression spring 15. Movement of rod 12 to the left acting through the spring 15 rocks the rocker 8 to the left and brings the worm into engagement with the worm wheel. However, if the teeth on such elements do not mesh at once, the arm 16 cannot move to its full leftward position and bolt 14 will slide therein and spring 15 be compressed and react thereafter to automatically and fully engage the worm with the worm wheel.

As a means for locking the worm in its driving position, I preferably provide a latch 24 pivoted to the arm 16 at 25 and notched at 26 to engage the block 13. A spring 27, engaging pins on the latch and rocker arm, serves to normally hold this latch in engaging position. As a means for automatically disengaging this latch when the operator releases the latch 19 and rod 12 under the action of spring 17 is moved to the right, I provide a member 28 having a beveled end 29. I secure this member 28 to the carriage 2 in such position that the beveled end 29 thereof is in the path of movement of the latch 24 and thereby serves to lift the latch when rod 12 is moved as above stated.

The operation of the mechanism is as follows: Assuming the elements to be engaged as shown in Fig. 2 and that it is desired to disengage the same the operator withdraws latch 19 by means of handle 22, thereby releasing rod 12 which is then forced to the right by means of spring 17. This movement turns the rocker 8 to the right and at the same time latch 24 rides upon bevel 29 and is thereby lifted from engagement with the block 13. As the rod 12 now continues its disengaging movement to the right the worm is rocked fully out of engagement with its worm wheel.

When it is desired to re-engage the driving elements, the operator pushes the rod 12 inward until the latch 19 snaps into position behind the shoulder 21, thereby holding the rod in such position. This movement of the rod rocks the rocker 8 to the left and engages the worm with the worm wheel 7. However, unless the teeth on the worm and worm wheel happen to mesh, the rocker cannot rock fully to the left and in this case the spring 15 will be compressed, the bolt 14 sliding freely in the arm, and will react against arm 16 to resiliently hold the worm in engagement with its worm wheel and automatically and fully engage such elements when the teeth thereon come into meshing position. When this final driving engagement takes place, the arm 16 will be rocked to its extreme left and and the latch 24 will automatically drop into its locking position as shown in Fig. 2 and positively hold these elements in such driving engagement.

What I claim is:

1. In a power transmission mechanism, the combination of a worm wheel and a coacting driving worm adapted to be engaged therewith and disengaged therefrom, resiliently acting means for fully engaging the worm with the worm wheel when the teeth thereon come into a meshing position, a latch for holding the resilient means in the worm engaging position, and means separate from the above means for locking the worm in full engagement with the worm wheel when such engagement takes place.

2. In a power transmission mechanism, the combination of a worm wheel and a coacting driving worm adapted to be engaged therewith and disengaged therefrom, resiliently acting means for fully engaging the worm with the worm wheel when the teeth thereon come into a meshing position, a latch for holding the resilient means in the worm engaging position, and automatically acting means separate from the above means for automatically locking the worm in full engagement with the worm wheel when such engagement takes place.

3. In a power transmission mechanism, the combination of a worm wheel and a coacting driving worm adapted to be held in an engaged or a disengaged position, resiliently acting means for fully engaging the worm with the worm wheel when the teeth thereon come into a meshing position, and a latch for positively and automatically locking the worm in full engagement with the worm wheel when such engagement takes place.

4. In a power transmission mechanism, the combination of two coacting rotatable toothed driving elements adapted to be engaged and disengaged, resiliently acting means for fully engaging said elements when the teeth thereon come into a meshing position, means separate from the above means for automatically locking the elements in the full engagement, and resilient means normally holding the elements in the disengaged position.

5. In a power transmission mechanism, the combination of a worm wheel and a coacting driving worm therefor, means for engaging and disengaging the worm and worm wheel including resiliently acting means for fully engaging such elements when the teeth thereon come into a meshing position, securing mechanism for holding the resiliently acting means in the worm engaging position, and means separate from the resiliently acting means for locking the elements in the full engagement when such engagement takes place.

6. In a power transmission mechanism, the combination of two coacting rotatable toothed driving elements adapted to be held in an engaged or disengaged position, a rocker having one of the elements mounted therein, resiliently acting means acting on the rocker to fully engage said elements when the teeth thereon come into a meshing position, and a latch for positively and automatically locking the elements in the full engagement.

7. In a power transmission mechanism, the combination of two coacting rotatable toothed driving elements adapted to be engaged and disengaged, a rocker having one of the elements mounted therein, resiliently acting means acting on the rocker to fully engage said elements when the teeth thereon come into a meshing position, a latch acting on the rocker for positively and automatically locking elements in the full engagement, and means for holding the rocker and elements in a disengaged position.

8. In a power transmission mechanism, the combination of a worm wheel and a coacting driving worm adapted to be held in an engaged or disengaged position, a drive shaft, a rocker mounted thereon and having the worm mounted therein and operatively connected to the shaft, resiliently acting means acting on the rocker to fully engage the worm with the worm wheel when the teeth thereon come into a meshing position, and a latch acting against the rocker to positively lock the worm and worm wheel in the full engagement.

9. In a power transmission mechanism, the combination of a worm wheel and a coacting driving worm adapted to be engaged and disengaged, resiliently acting means for fully engaging the worm with the worm wheel when the teeth thereon come into a meshing position, a latch for holding the resilient means in the worm engaging position, means separate from the above means for locking the worm in the full driving engagement, and means acting automatically to unlock the locking means when disengaging the worm.

10. In a power transmission mechanism, the combination of two coacting rotatable toothed driving elements adapted to be held in an engaged or disengaged position, resiliently acting means for fully engaging said elements when the teeth thereon come into a meshing position, a latch for positively and automatically locking the elements in the full engagement, and means in the path of movement of the latch for automatically lifting the latch when disengaging the elements.

11. In a power transmission mechanism, the combination of two coacting rotatable toothed driving elements, means for engaging and disengaging the elements including resiliently acting means for fully engaging said elements when the teeth thereon come into a meshing position, a latch for holding the resilient means in the element engaging position, means separate from the resiliently acting means for locking the elements in the full engagement, and means whereby the locking means is automatically disengaged upon disengaging movement of the disengaging means.

12. In a power transmission mechanism, the combination of two coacting rotatable toothed driving elements adapted to be engaged and disengaged, a rocker having one of the elements mounted therein, resiliently acting means acting on the rocker to fully engage said elements when the teeth thereon come into a meshing position, a latch for positively locking the elements in the full engagement, and means whereby the latch is automatically disengaged upon rocking movement of the rocker to disengage the elements.

13. In a power transmission mechanism, the combination of a worm wheel and a coacting driving worm adapted to be held in an engaged or disengaged position, a drive shaft, a rocker mounted thereon and having the worm mounted therein and operatively connected to the shaft, resiliently acting means acting on the rocker to fully engage the worm with the worm wheel when the teeth thereon come into a meshing position, a latch acting against the rocker to positively lock the worm and worm wheel in the full engagement, and a latch releasing element adapted to automatically disengage the said latch upon the rocking movement of the rocker to disengage the worm from the worm wheel.

14. In a power transmission mechanism, the combination of two coacting rotatable toothed driving elements, means tending to normally disengage the elements, and means for placing and holding the elements in an engaging position against the normal action of the first named means and including resilient means for automatically and fully engaging the elements when the teeth thereon come into a meshing position.

15. In a power transmission mechanism, the combination of two coacting rotatable toothed driving elements adapted to be engaged and disengaged, means tending to normally disengage the elements, means for placing and holding the elements in an engaging position against the normal action of the first named means and including resilient means for automatically and fully engaging said elements when the teeth thereon come into a meshing position, and means separate from the above resilient means for locking the elements in the full engagement.

16. In a power transmission mechanism, the combination of two coacting rotatable toothed driving elements adapted to be engaged and disengaged, means for engaging the elements including resiliently acting means for automatically and fully engaging said elements when the teeth thereon come into a meshing position, and a latch operating between certain of the first named means and the elements for positively locking the elements in the full engagement.

17. In a power transmission mechanism, the combination of two coacting rotatable toothed driving elements adapted to be engaged and disengaged, means for engaging the elements including resiliently acting means for automatically and fully engaging said elements when the teeth thereon come into a meshing position. means for holding the resilient means under compression with the elements in engagement. means for locking the elements in their full meshing engagement, and cooperating means for automatically releasing the locking means upon disengaging movement of the first named means.

18. In a power transmission mechanism, the combination of two coacting rotatable toothed driving elements adapted to be engaged and disengaged, means for engaging the elements including resiliently acting means for automatically and fully engaging said elements when the teeth thereon come into a meshing position, means for holding the resilient means under compression with the elements in engagement, a latch for positively and automatically locking the elements in their full meshing engagement, and cooperating means for automatically releasing the latch upon disengaging movement of the first named means.

19. In a power transmission mechanism, the combination of two coacting rotatable toothed driving elements adapted to be engaged and disengaged, means for engaging the elements including resiliently acting means for automatically and fully engaging said elements when the teeth thereon come into a meshing position, a latch operating between the first named means and the elements for positively locking the elements in the full engagement, and a member mounted on the frame of the machine and in the path of movement of the latch to disengage the same upon disengaging movement of the first named means.

20. In a power transmission mechanism, the combination of two coacting rotatable toothed driving elements adapted to be engaged and disengaged, a rocker having one of the elements mounted therein, a rod resiliently connected thereto and adapted to rock the rocker to engage the elements. a latch operating between the rod and the rocker for positively and automatically locking the elements in driving engagement, and cooperating means for automatically releasing the latch upon disengaging movement of the rod.

In testimony whereof, I hereto affix my signature.

JOHN C. BAKER.